United States Patent [19]
Antonioli et al.

[11] Patent Number: 5,773,716
[45] Date of Patent: Jun. 30, 1998

[54] METHOD AND UNIT FOR DIAGNOSING LEAKAGE OF AN INTERNAL COMBUSTION ENGINE HIGH-PRESSURE INJECTION SYSTEM

[75] Inventors: Pierpaolo Antonioli, Piossasco; Francesco De Cristofaro, Bruino; Roberto Imarisio, Giaveno; Carlo Andrea Malvicino, Torino; Riccardo Buratti, Genova, all of Italy

[73] Assignee: C.R.F. Societa Consortile Per Azioni, Strada Torino, Italy

[21] Appl. No.: 786,438

[22] Filed: Jan. 21, 1997

[30] Foreign Application Priority Data

Jan. 19, 1996 [IT] Italy ............................. TO96A0029
Jul. 9, 1996 [IT] Italy ............................. TO96A0585

[51] Int. Cl.[6] .................................................. G01M 15/00
[52] U.S. Cl. ..................................... 73/119 A; 701/103
[58] Field of Search ........................ 73/49.7, 118.1, 73/116, 117.2, 117.3; 364/431.051, 431.052, 431.053; 701/103, 104, 105

[56] References Cited

U.S. PATENT DOCUMENTS

| | | | |
|---|---|---|---|
| 4,559,815 | 12/1985 | Needham | 73/49.7 |
| 4,561,297 | 12/1985 | Holland | 73/49.7 |
| 5,020,362 | 6/1991 | Hart et al. | 73/49.7 |
| 5,445,019 | 8/1995 | Glidewell et al. | 73/119 A |
| 5,535,621 | 7/1996 | Glidewell et al. | 73/119 A |

*Primary Examiner*—George M. Dombroske
*Attorney, Agent, or Firm*—Ladas & Parry

[57] ABSTRACT

The diagnostic method includes the steps of: generating a pressure signal related to the fuel pressure of an injection system of an engine; comparing the pressure signal with a reference pressure value; determining a fuel leakage condition of the injection system when the pressure signal is less than the reference pressure value; reducing the quantity of fuel injected into the cylinders of the engine in the presence of the leakage condition; calculating a share value contributed by each cylinder to the work torque value generated by the engine; comparing each share value with a respective reference share value; determining a jammed-open injector condition when at least one of the share values is greater than the respective reference share value; and determining a supply circuit failure condition when the share values are all less than the respective reference share values.

30 Claims, 3 Drawing Sheets

METHOD AND UNIT FOR DIAGNOSING LEAKAGE OF AN INTERNAL COMBUSTION ENGINE HIGH-PRESSURE INJECTION SYSTEM

BACKGROUND OF THE INVENTION

The present invention relates to a method and unit for diagnosing leakage of an internal combustion engine high-pressure injection system.

As is known, high-pressure injection systems comprise a number of injectors and a high-pressure supply circuit for supplying the injectors with fuel.

One of the most serious problems of such systems is the possibility of one or more of the injectors becoming jammed in the open position, thus resulting in continuous supply of fuel to the cylinders, excessive fuel consumption, and abnormal combustion characterized by pressure peaks and a considerable increase in temperature inside the cylinders.

Being withstandable by the engine for no more than a brief period of time, the above phenomena may result in serious damage to engine components such as the connecting rod, piston or injector nozzles, and may immediately impair the performance and safety of the vehicle.

The fuel supply circuit of such systems is also subject to leakage caused, for example, by minute cracks in the high- and low-pressure conduits or by failure of parts of the supply circuit itself, and which is inflammable in contact with the high temperature of the engine. The problem is further compounded by the escaping fuel being pollutant and resulting in excessive fuel consumption.

SUMMARY OF THE INVENTION

It is an object of the present invention to provide a diagnostic method and unit for detecting the presence of an injector jammed in the open position, or leakage of the injector supply circuit.

The diagnostic method and unit according to the present invention must preferably also be capable of distinguishing in a straightforward, low-cost manner between fuel leakage of an engine injection system due to the presence of an injector jammed in the open position, and leakage due to failure of the injector supply circuit.

According to the present invention, there is provided a method of diagnosing leakage of a high-pressure injection system of an internal combustion engine comprising a number of cylinders and a number of injectors, each supplying fuel to a respective cylinder; characterized by comprising the steps of:

a) generating an operating signal related to a physical quantity of said injection system;

b) comparing said operating signal with a reference operating value; and c) determining a fuel leakage condition in the event of a predetermined operating relationship between said operating signal and said reference operating value.

According to the present invention, there is also provided a unit for diagnosing leakage of a high-pressure injection system of an internal combustion engine comprising a number of cylinders and a number of injectors, each supplying fuel to a respective cylinder; characterized by comprising:

operating signal generating means for generating an operating signal related to a physical quantity of said injection system;

first comparing means receiving said operating signal and for comparing said operating signal with a reference operating value; and fuel leakage detecting means connected to said first comparing means and for determining a fuel leakage condition in the event of a predetermined operating relationship between said operating signal and said reference operating value.

BRIEF DESCRIPTION OF THE DRAWINGS

Two preferred, non-limiting embodiments of the present invention will be described by way of example with reference to the accompanying drawings, in which.

DETAILED DESCRIPTION OF THE INVENTION

Figure 1:
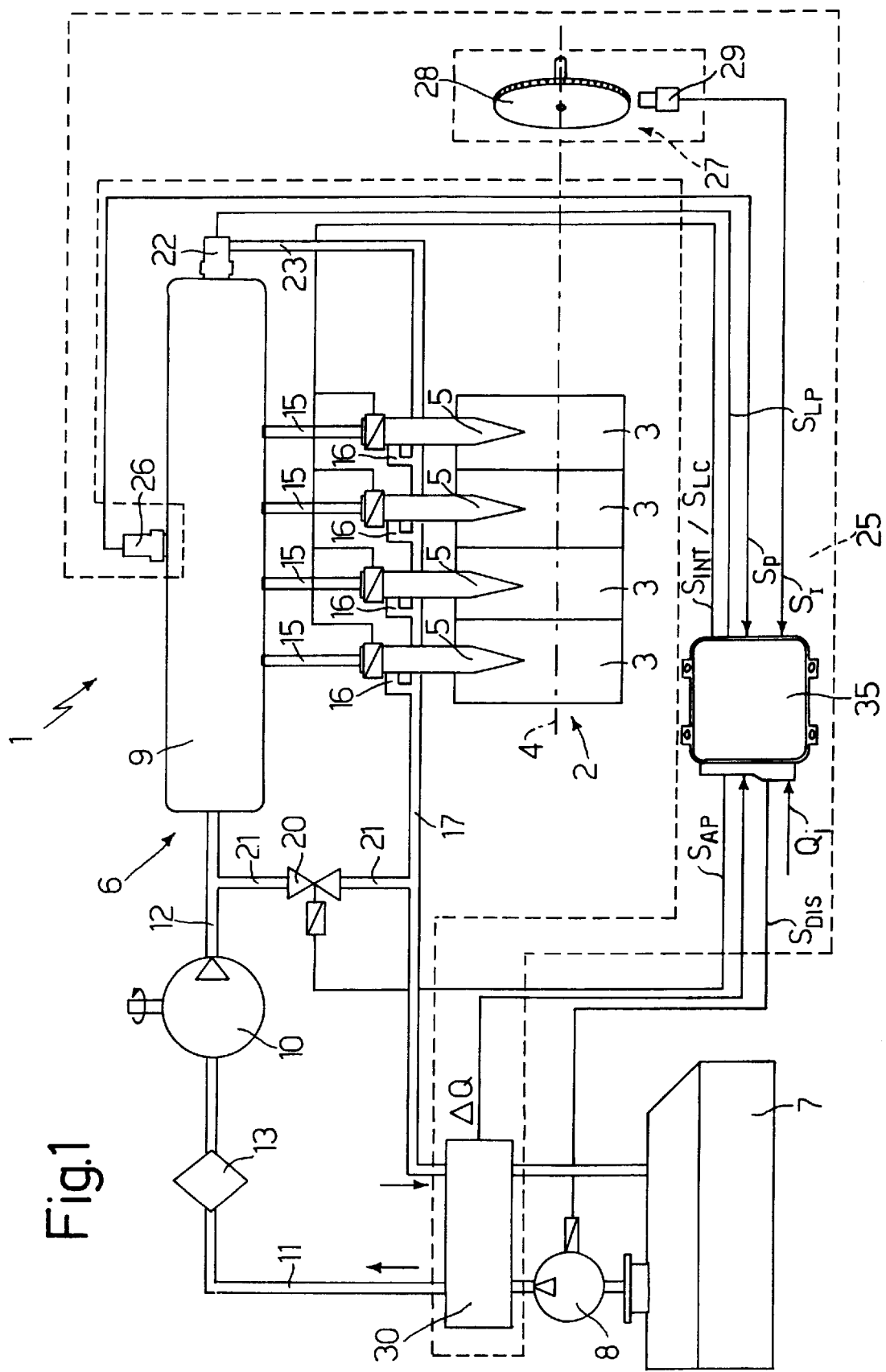
FIG. 1 shows a simplified diagram of a high-pressure injection system comprising a diagnostic unit in accordance with the present invention.

Number 1 in FIG. 1 indicates a high-pressure injection system for an internal combustion engine 2 comprising cylinders 3 and an output shaft 4 shown schematically by the dot-and-dash line.

Injection system 1 comprises a number of injectors 5 for supplying fuel to cylinders 3 of engine 2; and a "common rail" supply circuit 6 for supplying fuel to injectors 5.

Supply circuit 6 comprises a fuel tank 7; a delivery pump 8, e.g. electric, connected to tank 7; a known common rail 9; a high-pressure pump 10, e.g. a radial-piston pump, connected to delivery pump 8 by a low-pressure delivery line 11, and to common rail 9 by a high-pressure delivery line 12; and a fuel filter 13 located along low-pressure delivery line 11, between delivery pump 8 and high-pressure pump 10.

Common rail 9 is connected to injectors 5 by respective high-pressure supply conduits 15, and each injector 5 is connected by a respective recirculating conduit 16 to a drain line 17 in turn connected to tank 7 to feed part of the fuel used in known manner to operate injectors 5 back into tank 7.

Supply circuit 6 also comprises a pressure regulator 20 connected to high-pressure delivery line 12 and to drain line 17 by respective high-pressure recirculating conduits 21. When activated, pressure regulator 20 provides for feeding back into tank 7 part of the fuel supplied by high-pressure pump 10 to common rail 9, and so regulate, in known manner not described in detail, the pressure of the fuel supplied by high-pressure pump 10.

Supply circuit 6 also comprises a pressure relief device 22 connected on one side to common rail 9 and on the other side to drain line 17 by a recirculating conduit 23, and which prevents the pressure of the fuel in common rail 9 from exceeding a predetermined maximum value.

Injection system 1 also comprises a diagnostic unit 25 for detecting and diagnosing leakage of injection system 1.

Diagnostic unit 25 comprises a pressure sensor 26 connected to common rail 9 and generating a pressure signal $S_P$ related to the pressure of the fuel in common rail 9; and a detecting device 27 for detecting the speed and angular position of output shaft 4 of engine 2, and in turn comprising a known pulse wheel 28 fitted to output shaft 4, and an electromagnetic sensor 29 associated with pulse wheel 28 and generating an information signal $S_f$ related to the speed and angular position of pulse wheel 28 and therefore to the speed and angular position of output shaft 4.

Diagnostic unit 25 also comprises a differential flow sensor 30, e.g. a JAEGER GESCA II type, connected to low-pressure delivery line 11 and drain line 17, and for generating a consumption signal $\Delta Q$ related to the difference between the amount of fuel in lines 11 and 17 (i.e. related to the fuel consumption of injection system 1).

Diagnostic unit 25 also comprises an electronic central control unit 35 for controlling injection system 1, and which is supplied with consumption signal $\Delta Q$, a signal $Q_i$ supplied by the injection central control unit (not shown) and corresponding to the amount of fuel injected each time into cylinders 4, pressure signal $S_P$ and information signal $S_f$, and which provides for:

a) determining a possible leakage condition of injection system 1 by implementing the operations described later with reference to FIGS. 2 and 3;

b) determining whether the leakage condition is due to one or more injectors 5 being jammed in the open position, or to leakage of supply circuit 6 of injectors 5, by implementing the operations described later with reference to FIG. 4; and c) appropriately controlling injecting system 1, depending on the type of leakage diagnosed, as described later with reference to FIG. 4.

Electronic central control unit 35 preferably forms part of a central control unit (not shown) controlling the engine.

Figure 2:
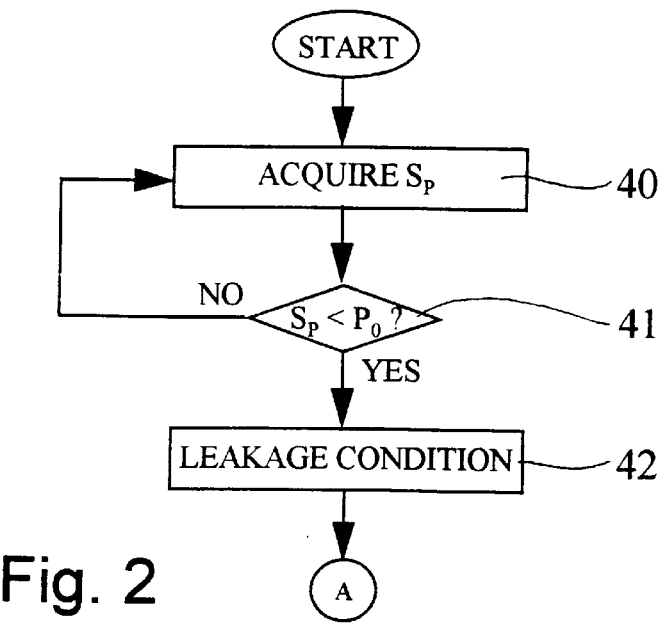
FIGS. 2, 3, 4 show flow charts of two embodiments of the diagnostic method according to the invention.

FIG. 2 shows a flow chart of a first embodiment of the method according to the invention for determining a possible leakage condition of injection system 1.

Said first embodiment is based on comparing pressure signal $S_P$ with a reference pressure value $P_O$, and determining a fuel leakage condition of injection system 1 when pressure signal $S_P$ is less than reference pressure value $P_O$.

As shown in FIG. 2, therefore, to determine a possible leakage condition of injection system 1, electronic central control unit 35 first acquires pressure signal $S_P$ (block 40), and compares pressure signal $S_P$ with a reference pressure value $P_O$ (block 41) calculated as a function of the speed of engine 2, e.g. memorized in an appropriate map.

If pressure signal $S_P$ is greater than reference pressure value $P_O$ (NO output of block 41), no leakage of injection system 1 is diagnosed by electronic central control unit 35, and operation commences once more from block 40. Conversely, if pressure signal $S_P$ is less than reference pressure value $P_O$ (YES output of block 41), electronic central control unit 35 diagnoses a leakage condition of injection system 1 and generates a fuel leakage signal (block 42).

Once a fuel leakage condition is determined, electronic central control unit 35 implements the operations described later with reference to FIG. 4 to determine whether leakage is due to an injector 5 jammed in the open position, or to failure of fuel supply circuit 6.

The advantages of the above first embodiment for determining a possible leakage condition of injection system 1 are as follows.

In particular, the above embodiment provides for indicating leakage and an injector 5 jammed in the open position to a high degree of precision according to the fall in fuel pressure in common rail 9.

Moreover, the above embodiment is straightforward, easy to implement, and involves only minor changes to injection system 1, i.e. the addition of a pressure sensor 26 connected to common rail 9, by virtue of the operations required being performable directly by the electronic injection central control unit.

Figure 3:
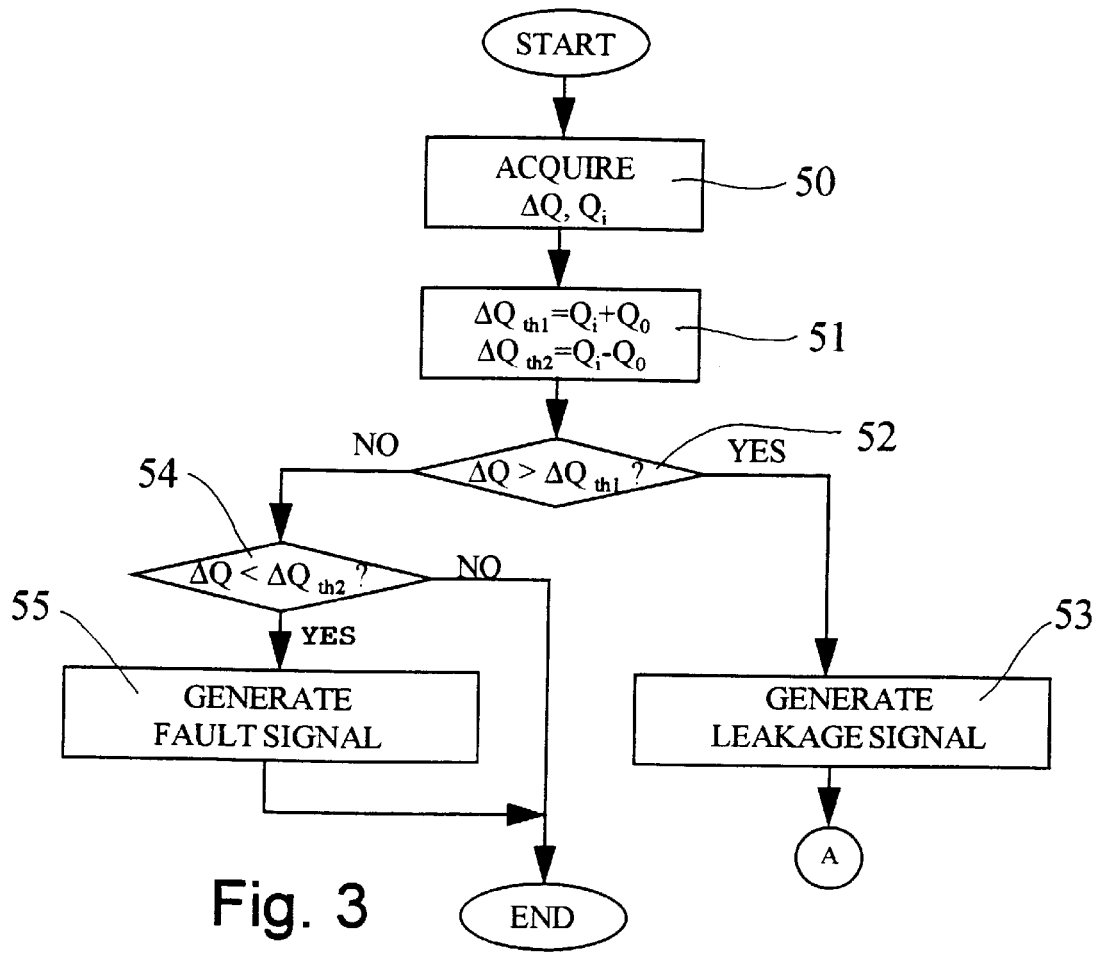

FIG. 3 shows a flow chart of a second embodiment of the method according to the invention for determining a possible leakage condition of injection system 1.

The second embodiment is based on monitoring the fuel consumption of injection system 1, which, under normal operating conditions, i.e. with no faults of injectors 5 or leakage of injection 1, equals the amount of fuel (known) injected by injectors 5 into cylinders 3 of engine 2.

Conversely, if an injector 5 is jammed in the open position, or in the event of leakage of injection system 1, fuel consumption increases and may therefore be monitored to indicate a leakage condition.

As shown in FIG. 3, therefore, to determine a possible leakage condition of injection system 1, electronic central control unit 35 first acquires consumption signal $\Delta Q$ and signal $Q_i$ (block 50) and calculates a first and second reference value $\Delta Q_{th1}$, $\Delta Q_{th2}$ (block 51).

More specifically, the first reference value $\Delta Q_{th1}$ is calculated as the sum of the injected fuel quantity $Q_i$ supplied by the injection central control unit (not shown) and a predetermined tolerance value $Q_o$; and the second reference value $\Delta Q_{th2}$ is calculated as the difference between $Q_i$ and $Q_o$.

Electronic central control unit 35 then compares consumption signal $\Delta Q$ with the first reference value $\Delta Q_{th1}$ (block 52).

If consumption signal $\Delta Q$ is greater than first reference value $\Delta Q_{th1}$ (YES output of block 52), electronic central control unit 35 diagnoses fuel consumption in excess of that required for correct injection, and generates a fuel leakage signal (block 53) indicating both leakage of injection system 1 and fuel leakage due to an injector 5 jammed in the open position.

Once a fuel leakage condition is determined, electronic central control unit 35 implements the operations described later on with reference to FIG. 4 to determine whether the leakage is due to an injector 5 jammed in the open position, or to failure of fuel supply circuit 6.

Conversely, if consumption signal $\Delta Q$ is less than first reference value $\Delta Q_{th1}$ (NO output of block 52), electronic central control unit 35 performs a further check to determine whether consumption signal $\Delta Q$ is less than second reference value $\Delta Q_{th2}$ (block 54), as possible, for example, if one or more injectors 5 are jammed in the closed position, or if high-pressure supply conduits 15 of injectors 5 are clogged, or if flow sensor 30 is defective.

If consumption signal $\Delta Q$ is less than second reference value $\Delta Q_{th2}$ (YES output of block 54), electronic central control unit 35 diagnoses a malfunction of injection system 1 and generates a fault signal (block 55). Conversely (NO output of block 54), diagnosis is terminated.

The above diagnosis is preferably repeated for each engine cycle to continually monitor operation of injection system 1.

The advantages of the second embodiment for determining a possible leakage condition of injection system 1 are as follows.

In particular, the second embodiment provides for determining leakage and an injector 5 jammed in the open position to a high degree of precision according to the fall in fuel pressure in common rail 9; and using a differential flow sensor 30 provides for greater measuring precision as compared with two separate flow sensors, the respective measuring errors of which are added.

Moreover, the second embodiment provides for diagnosing general malfunctioning of injection system 1 when fuel consumption is found to be lower than expected.

Finally, the second embodiment is straightforward, easy to implement, and involves only minor changes to injection system 1, i.e. the addition of a known differential flow sensor, by virtue of the operations required being performable directly by the electronic injection central control unit.

Figure 4:
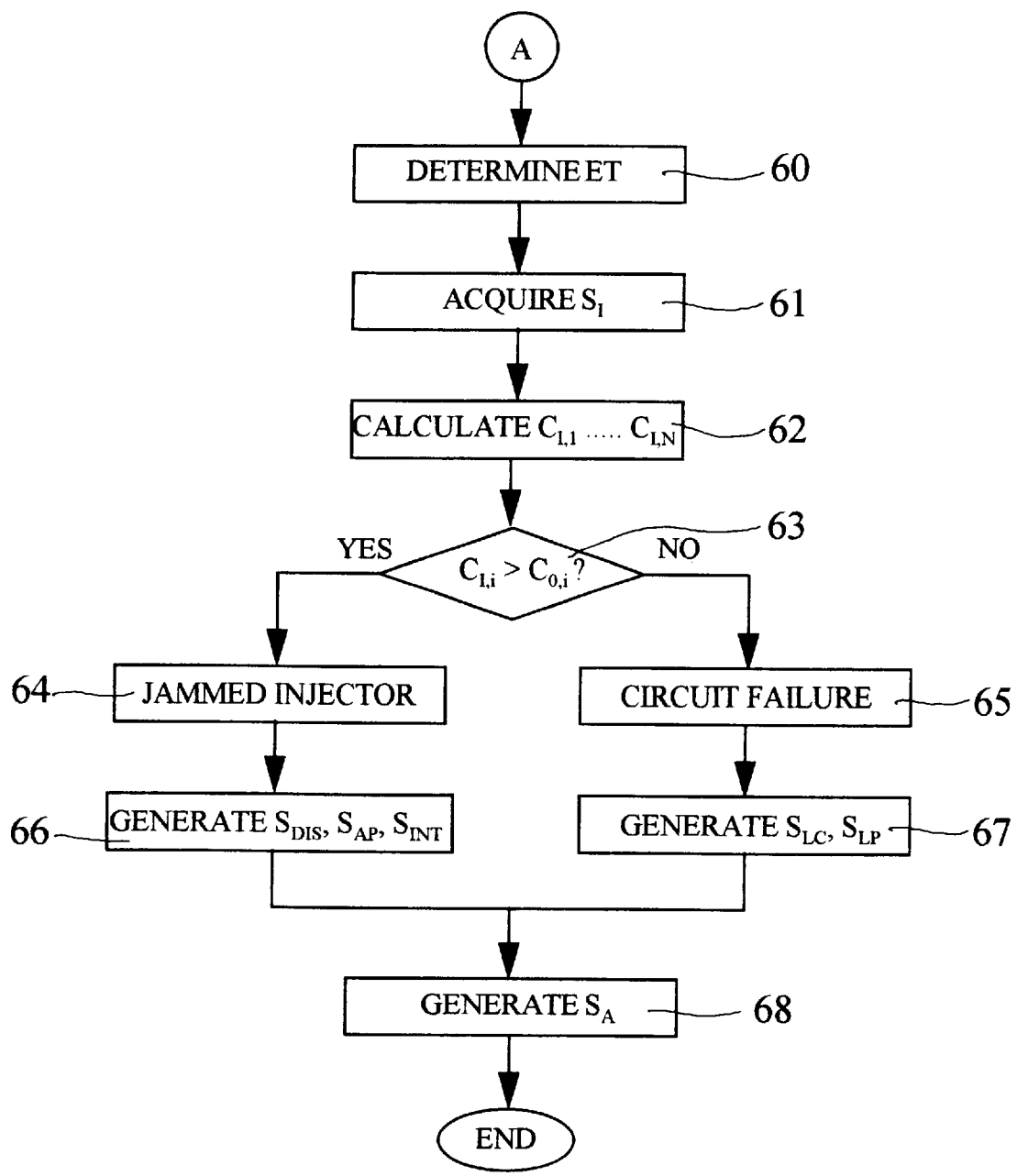

FIG. 4 shows a flow chart of the operations implemented by electronic central control unit 35, upon determining a leakage condition, to determine whether leakage is due to an injector 5 jammed in the open position, or to failure of fuel supply circuit 6.

The type of leakage of injection system 1 is determined by reducing the amount of fuel injected into cylinders 3; calculating the value of the work torque $C_U$ generated by engine 2; comparing the calculated work torque value $C_U$ with a reference work torque value $C_T$; and determining the type of leakage of injection system 1 according to the outcome of the above comparison.

More specifically, an injector jammed in the open position is indicated by a work torque value $C_U$ greater than reference work torque value $C_T$. Conversely, failure of supply circuit 6 is indicated.

As shown in FIG. 4, therefore, to determine the type of leakage of injection system 1, electronic central control unit 35 first reduces the amount of fuel injected into each cylinder 3 by reducing the injection time. For which purpose, a reduced injection time value is calculated, and a reduced injection time signal ET is generated and supplied to each injector 5, which therefore reduces the value of the total work torque $C_U$ generated by engine 2 (block 60).

If the diagnosed leakage is due to failure of supply circuit 6, the reduction in the amount of fuel injected into cylinders 3 causes a predetermined reduction, as a function of the calculated reduced injection time value, in the share value $C_I$ contributed by each cylinder 3 to the work torque value $C_U$. Conversely, if the diagnosed leakage is due to an injector 5 jammed in the open position, the reduction in the amount of fuel injected causes a smaller reduction, as compared with the previous case, in the share values $C_I$ of work torque value $C_U$.

That is, in the event an injector 5 is jammed in the open position, a continuous flow of fuel is supplied to respective cylinder 3, so that no reduction is made in the share value contributed by the cylinder to the value of the work torque $C_U$ generated by engine 2.

Therefore, to determine the type of leakage of injection system 1, electronic central control unit 35 acquires (block 61) information signal $S_I$ (related to the speed and angular position of output shaft 4), and, on the basis of the information signal, calculates the share value $C_{I,i}$ contributed by each cylinder 3 to work torque value $C_U$ (block 62), where "i" may range from 1 to N, N being equal to the number of cylinders 3 of engine 2, and the value of which indicates a particular cylinder 3.

More specifically, the share value $C_{I,i}$ contributed by each cylinder 3 to work torque value $C_U$ may be calculated on the basis of information signal $S_I$ as described in detail, for example, in patent application TO93A000581 filed on Apr. 8, 1993 by the present Applicant.

Electronic central control unit 35 then compares each share value $C_{I,i}$ with a respective reference share value $C_{O,i}$ (block 63), which is calculated each time as a function of reduced injection time signal ET according to an equation $C_O = f(ET)$ memorized in electronic central control unit 35, or is read each time from a map memorized in central control unit 35.

If at least one of share values $C_{I,i}$ is greater than the respective reference share value $C_{O,i}$ (YES output of block 63), electronic central control unit 35 diagnoses an injector jammed in the open position, i.e. diagnoses leakage of injection system 1 due to one or more injectors 5 jammed in the open position, and generates a jammed-open injector signal (block 64). Conversely, if share values $C_{I,i}$ are all less than respective reference share values $C_{O,i}$ (NO output of block 63), electronic central control unit 35 diagnoses a supply circuit failure condition, i.e. diagnoses leakage of injection system 1 due to failure of fuel supply circuit 6, and generates a supply circuit failure signal (block 65).

Moreover, knowing which share value/s $C_{I,i}$ is/are greater than the respective reference share value/s $C_{O,i}$, electronic central control unit 35 also determines which injector/s 5 is/are jammed in the open position.

Electronic central control unit 35 then generates signals for controlling injection system 1 according to the type of leakage diagnosed.

More specifically, if leakage due to an injector 5 jammed in the open position (jammed-open injector condition) is diagnosed, electronic central control unit 35 generates three signals: a disabling signal $S_{DIS}$ supplied to delivery pump 8 to cut off fuel supply to injectors 5; an opening signal $S_{AP}$ supplied to pressure regulator 20 to drain the fuel from common rail 9; and a cutoff signal $S_{INT}$ supplied to each injector 5 to cut off fuel injection into cylinders 3 and so turn off engine 2 (block 66).

Conversely, if leakage due to failure of supply circuit 6 (supply circuit failure condition) is diagnosed, electronic central control unit 35 generates two signals: a fuel limiting signal $S_{LC}$ supplied to injectors 5 to limit the maximum amount of fuel injectable into each cylinder 3; and a pressure limiting signal $S_{LP}$ supplied to pressure relief device 22 to limit the maximum fuel pressure in common rail 9 (block 67).

Finally, electronic central control unit 35 generates a malfunction signal $S_A$ indicating the type of leakage detected, and which is supplied to optical or acoustic indicating devices (block 68).

The advantages of the present diagnostic method are as follows.

In particular, the present method provides for discriminating between fuel leakage of injection system 1 due to an injector 5 jammed in the open position, and leakage due to failure of supply circuit 6. As such, diagnostic unit 25 may intervene drastically to so operate injection system 1 as to turn off engine 2 and stop the vehicle immediately in a situation of real danger (jammed-open injector), or may intervene less drastically, in the event of less serious leakage, by so operating injecting system 1 as to indicate the fault and permit the vehicle to reach the nearest repair shop.

Clearly, changes may be made to the diagnostic method and unit as described and illustrated herein without, however, departing from the scope of the present invention.

We claim:

1. A method of diagnosing leakage of a high-pressure injection system (1) of an internal combustion engine (2) comprising a number of cylinders (3) and a number of injectors (5), each supplying fuel to a respective cylinder (3); characterized by comprising the steps of:

a) generating an operating signal ($S_p$; $\Delta Q$) related to a physical quantity of said injection system (1);

b) comparing said operating signal ($S_p$; $\Delta Q$) with a reference operating value ($P_O$; $\Delta Q_{th1}$);

c) determining a fuel leakage condition in the event of a predetermined operating relationship between said operating signal ($S_p$; $\Delta Q$) and said reference operating value ($P_O$; $\Delta Q_{th1}$);

d) reducing the quantity of fuel injected into said cylinders (3) in the presence of said leakage condition, e) calculating a work torque value ($C_U$) of said engine (2);

f) comparing said calculated work torque value ($C_U$) with a reference work torque value ($C_T$); and g) determining a type of leakage on the basis of said comparison.

2. A method as claimed in claim 1, characterized in that said step d) comprises the step of:

d1) generating a reduced injection time signal (ET) supplied to a respective injector (5).

3. A method as claimed in claim 1, characterized by also comprising the step of:

generating a malfunction signal ($S_A$) indicating the type of leakage detected.

4. A method as claimed in claim 1, characterized in that said step e) comprises the step of:

e1) calculating a share value ($C_{I,i}$) contributed by each of said cylinders (3) to said work torque value ($C_U$);

and in that said step f) comprises the step of:

f1) comparing each of said share values ($C_{I,i}$) with a respective reference share value ($C_{O,i}$).

5. A method as claimed in claim 4, characterized in that said step e1) comprises the steps of:

e11) generating an information signal ($S_I$) related to the speed and angular position of said engine (2); and e12) calculating each o said share values ($C_{I,i}$) on the basis of said information signal ($S_I$).

6. A method as claimed in claim 4, characterized in that said step g comprises the steps of:

g1) determining a jammed-open injector condition when at least one of said share values ($C_{I,i}$) presents a first predetermined relationship with the respective reference share value ($C_{O,i}$); and g2) determining a supply circuit failure condition when none of said share values ($C_{I,i}$) presents said first predetermined relationship with the respective reference share value ($C_{O,i}$).

7. A method as claimed in claim 6, characterized in that said step g1) comprises the step of:

g1) determining whether at least one of said share values ($C_{I,i}$) is greater than the respective reference share value ($C_{O,i}$).

8. A method as claimed in claim 6, characterized in that said step g2) comprises the step of:

g21) determining whether said share values ($C_{I,i}$) are all less than the respective reference share values ($C_{O,i}$).

9. A method as claimed in claim 6, for an injection system (1) comprising a delivery pump (8); a common rail (9); a high-pressure pump (10); a pressure regulator (20); and a pressure relief device (22); characterized in that, in the presence of said jammed-open injector condition, there are also performed the steps of:

h) generating a disabling signal ($S_{DIS}$) for said delivery pump (8);

i) generating an opening signal ($S_{AP}$) for said pressure regulator (20); and j) generating a cutoff signal ($S_{INT}$) to cut off said injectors (5);

and in that, in the presence of said supply circuit failure condition, there are also performed the steps of:

k) generating a fuel limiting signal ($S_{LC}$) for said injectors (5); and l) generating a pressure limiting signal ($S_{LP}$) for said pressure relief device (22).

10. A method as claimed in claim 1, characterized in that said operating signal ($S_p$; $\Delta Q$) is a pressure signal ($S_p$) related to a pressure of said fuel in said injection system (1), and said reference operating value ($P_O$; $\Delta Q_{th1}$) is a reference pressure value ($P_O$).

11. A method as claimed in claim 10, characterized in that said step c) comprises the step of:

c1) determining whether said pressure signal ($S_p$) is less than said reference pressure value ($P_O$).

12. A method as claimed in claim 1, characterized in that said operating signal ($S_p$; $\Delta Q$) is a consumption signal ($\Delta Q$) related to the fuel consumption of said injection system (1), and said reference operating value ($P_O$; $\Delta Q_{th1}$) is a first reference consumption value ($\Delta Q_{th1}$).

13. A method as claimed in claim 12, characterized in that said step b) comprises the steps of:

b1) generating said first reference consumption value ($\Delta Q_{th1}$) on the basis of the quantity of fuel to be injected ($Q_i$); and b2) comparing the amplitude of said consumption signal ($\Delta Q$) with said first reference consumption value ($\Delta Q_{th1}$).

14. A method as claimed in claim 13, characterized in that said step c) comprises the step of:

c1) generating a fuel leakage signal in the event the amplitude of said consumption signal ($\Delta Q$) is greater than said first reference consumption value ($\Delta Q_{th1}$).

15. A method as claimed in claim 13, characterized by comprising the step of:

generating a fault signal in the event the amplitude of said consumption signal ($\Delta Q$) is less than a second reference consumption value ($\Delta Q_{th2}$).

16. A unit (25) for diagnosing leakage of a high-pressure injection system (1) of an internal combustion engine (2) comprising a number of cylinders (3) and a number of injectors (5), each supplying fuel to a respective cylinder (3); characterized by comprising:

operating signal generating means (26; 30) for generating an operating signal ($S_p$; $\Delta Q$) related to a physical quantity of said injection system (1);

first comparing means (41; 52) receiving said operating signal ($S_p$; $\Delta Q$) and for comparing said operating signal ($S_p$; $\Delta Q$) with a reference operating value ($P_O$; $\Delta Q_{th1}$);

fuel leakage detecting means (42; 53) connected to said first comparing means (41; 52) and for determining a fuel leakage condition in the event of a predetermined operating relationship between said operating signal (Sp, $\Delta Q$) and said refernce operating valve ($S_p$; $\Delta Q_{th1}$);

limiting means (60) connected to said fuel leakage detecting means (42; 53) and for reducing the quantity of fuel injected into said cylinders (3) in the presence of said leakage condition;

processing means (61, 62) for calculating a work torque value ($C_U$) of said engine (2);

second comparing means (63) connected to said processing means (61, 62) and for comparing said work torque value ($C_U$) with a reference work torque value ($C_T$); and leakage type detecting means (64, 65) connected to said second comparing means (63) and for determining a type of leakage of said injection system (1) on the basis of said comparison.

17. A unit as claimed in claim 16, characterized in that said limiting means comprise:

reduced injection time signal generating means (60) for generating a reduced injection time signal (ET) for each of said injectors (5).

18. A unit as claimed in claim 16, characterized in that said operating signal ($S_P$; $\Delta Q$) is a pressure signal ($S_P$) related to a pressure of said fuel in said injection system (1), and said reference operating value ($P_O$; $\Delta Q_{th1}$) is a reference pressure value ($P_O$).

19. A unit as claimed in claim 18, characterized in that said fuel leakage detecting means (42; 52) comprise first discriminating means (42) for determining said fuel leakage condition when said pressure signal ($S_P$) is less than said reference pressure value ($P_O$).

20. A unit as claimed in claim 16, characterized in that said operating signal ($S_P$; $\Delta Q$) is a consumption signal ($\Delta Q$) related to the fuel consumption of said injection system (1), and said reference operating value ($P_O$; $\Delta Q_{th1}$) is a first reference consumption value ($\Delta Q_{th1}$).

21. A unit as claimed in claim 20, for an injection system (1) comprising a delivery line (11) and a drain line (17); characterized in that said operating signal generating means (26; 30) comprise a differential flow sensor (30) generating said consumption signal ($\Delta Q$) related to the difference between the fuel supply along said delivery line (11) and said drain line (17).

22. A unit as claimed in claim 21, characterized in that said first comparing means (41; 52) comprise an amplitude comparator (52) for comparing the amplitude of said consumption signal ($\Delta Q$) with said first reference consumption value ($\Delta Q_{th1}$).

23. A unit as claimed in claim 20, characterized in that said fuel leakage detecting means (42; 53) comprise fuel leakage signal generating means (53) for generating a fuel leakage signal when said consumption signal ($\Delta Q$) is greater than said first reference consumption value ($\Delta Q_{th1}$).

24. A unit as claimed in claim 20, characterized by also comprising fault signal generating means (54, 55) for generating a fault signal when said consumption signal ($\Delta Q$) is less than a second reference consumption value ($\Delta Q_{th2}$).

25. A unit as claimed in claim 16, characterized in that said processing means comprise:

first calculating means (27, 61, 62) for calculating a share value ($C_{I,i}$) contributed by each of said cylinders (3) to said work torque value ($C_U$);

and in that said second comparing means comprise:

comparing means (63) connected to said first calculating means (27, 61, 62) to compare each of said share values ($C_{I,i}$) with a respective reference share value ($C_{O,i}$).

26. A unit as claimed in claim 25, characterized in that said first calculating means (27, 61, 62) comprise:

speed and position detecting means (27, 61) for generating an information signal ($S_I$) related to the speed and angular position of said engine (2); and evaluating means (62) connected to said speed and position detecting means (27, 61) and for calculating each of said share values ($C_{I,i}$) of said work torque value ($C_U$) on the basis of said information signal ($S_I$).

27. A unit as claimed in claim 25, characterized in that said leakage type detecting means (64, 65) comprise:

jammed-open injector detecting means (64) connected to said comparing means (63) and for determining a jammed-open injector condition when at least one of said share values ($C_{I,i}$) presents a first predetermined relationship with the respective reference share value ($C_{O,i}$); and supply circuit failure detecting means (65) connected to said comparing means (63) and for determining a supply circuit failure condition when none of said share values ($C_{I,i}$) presents said first predetermined relationship with the respective reference share value ($C_{O,i}$).

28. A unit as claimed in claim 27, characterized in that said jammed-open injector detecting means comprise:

second discriminating means (64) for determining said jammed-open injector condition when at least one of said share values ($C_{I,i}$) is greater than the respective reference share value ($C_{O,i}$).

29. A unit as claimed in claim 27, characterized in that said supply circuit failure detecting means comprise:

third discriminating means (65) for determining said supply circuit failure condition when said share values ($C_{I,i}$) are all less than the respective reference share values ($C_{O,i}$).

30. A unit as claimed in claim 27, for an injection system comprising a fuel tank (7); a delivery pump (8) connected to said tank (7); a common rail (9); a high-pressure pump (10) connected to the delivery pump (8) and to the common rail (9); a pressure regulator (20) connected between a high-pressure delivery line (12) and the drain line (17); and a pressure relief device (22) connected to the common rail (9) and to the drain line (17);

characterized by comprising:

disabling signal generating means (66) enabled by said jammed-open injector detecting means (64) to generate a disabling signal ($S_{DIS}$) for said delivery pump (8);

opening signal generating means (66) enabled by said jammed-open injector detecting means (64) to generate an opening signal ($S_{AP}$) supplied to said pressure regulator (20); and cutoff signal generating means (66) enabled by said jammed-open injector detecting means (64) to generate a cutoff signal ($S_{INT}$) supplied to each of said injectors (5);

and by comprising:

fuel limiting signal generating means (67) enabled by said supply circuit failure detecting means (65) to generate a fuel limiting signal for said injectors (5); and pressure limiting signal generating means (67) enabled by said supply circuit failure detecting means (65) to generate a pressure limiting signal for said pressure relief device (22).

* * * * *